United States Patent
Liu

(10) Patent No.: US 9,113,359 B2
(45) Date of Patent: Aug. 18, 2015

(54) METHOD FOR LOADING UPLINK SIMULATION DATA OF TERMINAL AND TERMINAL

(75) Inventor: Feng Liu, Shenzhen (CN)

(73) Assignee: ZTE CORPORATION (CN)

( * ) Notice: Subject to any disclaimer, the term of this patent is extended or adjusted under 35 U.S.C. 154(b) by 336 days.

(21) Appl. No.: 13/697,572

(22) PCT Filed: Apr. 7, 2011

(86) PCT No.: PCT/CN2011/072493
§ 371 (c)(1),
(2), (4) Date: Nov. 13, 2012

(87) PCT Pub. No.: WO2011/140870
PCT Pub. Date: Nov. 17, 2011

(65) Prior Publication Data
US 2013/0058219 A1 Mar. 7, 2013

(30) Foreign Application Priority Data
May 13, 2010 (CN) .......................... 2010 1 0180347

(51) Int. Cl.
*G01R 31/08* (2006.01)
*H04W 24/06* (2009.01)

(52) U.S. Cl.
CPC ..................................... *H04W 24/06* (2013.01)

(58) Field of Classification Search
None
See application file for complete search history.

(56) References Cited

U.S. PATENT DOCUMENTS

| | | | |
|---|---|---|---|
| 7,286,802 B2 * | 10/2007 | Beyme et al. | 455/67.14 |
| 8,019,385 B1 * | 9/2011 | Mansour et al. | 455/561 |
| 8,060,852 B1 * | 11/2011 | Varma et al. | 716/136 |
| 8,098,748 B1 * | 1/2012 | Mansour et al. | 375/260 |
| 8,260,286 B2 * | 9/2012 | Vikstedt et al. | 455/423 |
| 8,848,550 B2 * | 9/2014 | Tidestav | 370/252 |
| 2004/0218521 A1 * | 11/2004 | Bolinth et al. | 370/206 |
| 2007/0036064 A1 * | 2/2007 | Song et al. | 370/206 |

(Continued)

FOREIGN PATENT DOCUMENTS

| | | |
|---|---|---|
| CN | 1377164 | 10/2002 |
| CN | 1993953 | 7/2007 |
| CN | 101401336 | 4/2009 |

OTHER PUBLICATIONS

International Search Report for International Patent Application No. PCT/CN2011/072493, mailed Jul. 14, 2011.

*Primary Examiner* — Phirin Sam
(74) *Attorney, Agent, or Firm* — McAndrews, Held & Malloy, Ltd.

(57) ABSTRACT

The disclosure provides a method for loading uplink simulation data of a terminal, and a terminal, which belong to the field of wireless communication. The method comprises: after being powered on, the terminal imports simulation data to a memory of an uplink master-control Digital Signal Processor (DSP) of the terminal; the terminal performs uplink access, and transmits the simulation data to a channelized memory after the uplink access succeeds; then the terminal performs Inverse Fast Fourier Transform (IFFT) on the simulation data in each uplink sub-frame, and transmits the transformed simulation data to a base station via a radio frequency unit. According to the disclosure, the problem that a single terminal can not load data services of multiple terminals at the same time is solved; therefore, the effect of simulating to load noise transmission, load multi-terminal transmission, and load noise and terminal service transmission is achieved.

13 Claims, 4 Drawing Sheets

(56) References Cited

U.S. PATENT DOCUMENTS

| | | | |
|---|---|---|---|
| 2007/0230356 A1* | 10/2007 | Kalantri et al. | 370/241 |
| 2008/0010622 A1* | 1/2008 | Hsu et al. | 716/4 |
| 2008/0270098 A1* | 10/2008 | Sarkkinen | 703/13 |
| 2009/0034610 A1* | 2/2009 | Lee et al. | 375/240.02 |
| 2010/0121617 A1* | 5/2010 | Gruener et al. | 703/2 |
| 2011/0206107 A1* | 8/2011 | Bottomley et al. | 375/227 |

* cited by examiner

METHOD FOR LOADING UPLINK SIMULATION DATA OF TERMINAL AND TERMINAL

TECHNICAL FIELD OF THE INVENTION

The disclosure relates to the field of wireless communication, and in particular to a method for loading uplink simulation data of a terminal, and a terminal.

BACKGROUND OF THE INVENTION

In a wireless communication system, an uplink of User Equipment (UE, also called a terminal) mainly completes the following tasks: data code, modulation, channelization, Inverse Fast Fourier Transform (IFFT), and transmitting data out in a form of a carrier signal through a radio frequency unit.

Generally, on a designated bandwidth, one UE can load and transmit data services of one single UE only at one time, but can not load or transmit the data services of multiple UEs at the same time. If it is expected to test an anti-interference capability of a base station, two UEs are needed to transmit data services in an interfering manner; however, a common single UE can not implement the requirement. If it is expected to implement service tests on multiple UEs simultaneously but there are not enough UEs for the test actually, a common single UE can not implement the requirement either. If it is expected to test a state of a base station in a condition that the base station simultaneously receives noise interference and normal service data, a common single UE can not implement the requirement.

In view of the problem in the relevant art that a single UE can not load the data services of multiple UEs at the same time, no effective solution has been proposed so far.

SUMMARY OF THE INVENTION

The disclosure provides a method for loading uplink simulation data of a terminal, and a terminal, to at least solve one of the problems above.

According to one aspect of the disclosure, a method for loading uplink simulation data of a terminal is provided, which comprises: the terminal importing simulation data to a memory of an uplink master-control Digital Signal Processor (DSP) of the terminal, after the terminal is powered on; the terminal performing uplink access and transmitting the simulation data to a channelized memory after the uplink access succeeds; and the terminal performing an Inverse Fast Fourier Transform (IFFT) on the simulation data in each uplink sub-frame and transmitting the transformed simulation data to a base station via a radio frequency unit.

Preferably, the terminal adopts a Frequency Division Duplex (FDD) transmission mode; the step of the terminal performing the IFFT on the simulation data in each uplink sub-frame comprises: the terminal performing the IFFT on the simulation data after each Transmit Time Interval (TTI) interrupt arrives.

Preferably, the terminal adopts a Time Division Duplex (TDD) transmission mode; the step of the terminal performing the IFFT on the simulation data in each uplink sub-frame comprises: after each TTI interrupt arrives, the terminal determining whether a current TTI belongs to uplink sub-frame scheduling, if so, the terminal performing the IFFT on the simulation data.

Preferably, the simulation data are data processed by an algorithm simulation platform in advance, and the simulation data at least comprise one of the following: simulated service data of multiple terminals, noises or data consisting of noises and service data.

Preferably, before performing the IFFT on the simulation data, the method further comprises: performing a Cyclic Redundancy Check (CRC) on the simulation data; after the CRC succeeds, executing the step of performing the IFFT on the simulation data.

According to another aspect of the disclosure, a terminal is provided, which comprises: a data import module, which is configured to import simulation data to a memory of an uplink master-control DSP of the terminal after the terminal is powered on; a data transfer module, which is configured to transmit the simulation data to a channelized memory after an uplink access of the terminal succeeds; and a transmission module, which is configured to perform an IFFT on the simulation data in each uplink sub-frame and transmit the transformed simulation data to a base station via a radio frequency unit.

Preferably, the terminal adopts an FDD transmission mode; the transmission module comprises: a first data transformation unit, which is configured to perform the IFFT on the simulation data after each TTI interrupt arrives; and a first transmission unit, which is configured to transmit the transformed simulation data to the base station via the radio frequency unit.

Preferably, the terminal adopts a TDD transmission mode; the transmission module comprises: a second data transformation unit, which is configured to determine whether a current TTI belongs to uplink sub-frame scheduling after each TTI interrupt arrives, if so, perform the IFFT on the simulation data; and a second transmission unit, which is configured to transmit the transformed simulation data to the base station via the radio frequency unit.

Preferably, the simulation data imported by the data import module is data processed by an algorithm simulation platform in advance, and the simulation data imported by the data import module at least comprise one of the following: simulated service data of multiple terminals, noises or data consisting of noises and service data.

Preferably, the terminal further comprises: a check module, which is configured to perform a CRC on the simulation data in the channelized memory and trigger the transmission module to perform the IFFT on the simulation data after the CRC succeeds.

With the disclosure, the terminal imports the simulation data to the memory of the uplink master-control DSP of the terminal after being powered on, and the terminal transmits the simulation data after successfully accessing the base station, thus the problem that a single terminal can not load data services of multiple terminals at the same time is solved; therefore, the effect of simulating to load noise transmission, load multi-terminal transmission, and load noise and terminal service transmission is achieved.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The disclosure is described below in detail by reference to the accompanying drawings in conjunction with embodiments. It should be noted that the embodiments in the application and the characteristics of the embodiments can be combined if no conflict is caused.

A wireless communication system comprises a terminal and a base station, wherein the connection between the terminal and the base station follows related communication standards of the wireless communication system. Each embodiment of the disclosure illustrated below is implemented based on the wireless communication system.

Embodiment 1

Figure 1:
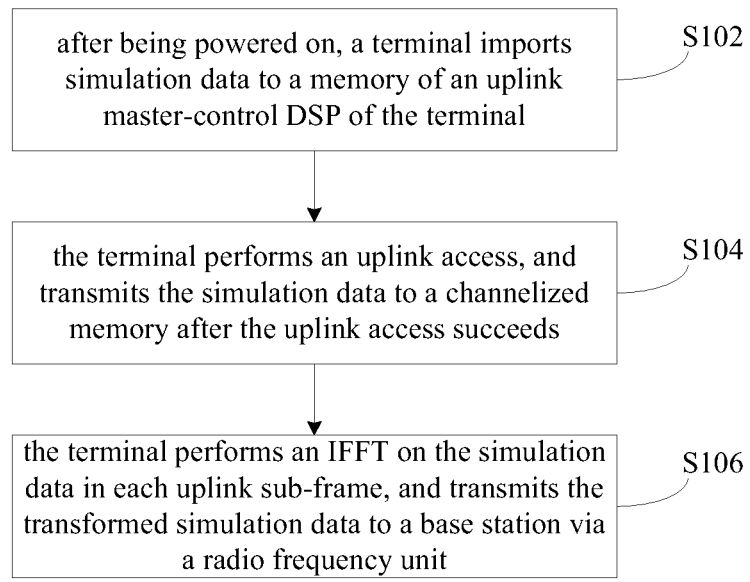
FIG. 1 shows a flowchart of a method for loading uplink simulation data of a terminal according to the Embodiment 1 of the disclosure.

FIG. 1 shows a flowchart of a method for loading uplink simulation data of a terminal according to the Embodiment 1 of the disclosure; as shown in FIG. 1, the method comprises the following steps.

Step S102: after being powered on, the terminal imports simulation data to a memory of an uplink master-control DSP of the terminal.

The simulation data are data processed by an algorithm simulation platform in advance, and the simulation data at least comprise one of the following: simulated service data of multiple terminals, noises or data consisting of noises and service data.

The simulation data can be generated according to test requirements, for example, the simulation data are simulated service data of multiple terminals. In order to achieve a testing purpose, the simulation data can be processed in advance, for example, the simulation data are processed by the algorithm simulation platform in advance. The algorithm simulation platform can be implemented by adopting Matrix Laboratory (MATLAB) software; in this way, the processed simulation data needs no operations of the terminal, such as coding, modulation and channelization, thus, the processing task of the terminal is simplified.

Since the content in the terminal memory will be lost after the memory is powered off and the data can not be imported or loaded if the terminal is not powered on, this embodiment selects to import the simulation data after the terminal is powered on.

In order to import the simulation data to the memory of the uplink master-control DSP after the terminal is powered on, a data import module can be configured on an interface of the terminal (that is, an external interface or a network port of the terminal) to accomplish the import operation.

Step S104: the terminal performs uplink access, and transmits the simulation data to a channelized memory after the uplink access succeeds.

The terminal implements the uplink access to a base station through a downlink synchronization process and an uplink random access process.

Step S106: the terminal performs an IFFT on the simulation data in each uplink sub-frame, and transmits the transformed simulation data to a base station via a radio frequency unit.

In Step S106, the processing on the simulation data in each uplink sub-frame can be performed according to the transmission mode adopted by the terminal, for example, an FDD transmission mode or a TDD transmission mode adopted by the terminal.

In a relevant art, after being powered on, the terminal accesses a base station through a downlink synchronization process and an uplink random access process. During these processes, the loaded data received by the uplink of the terminal are scheduled and generated through the Media Access Control (MAC) of the terminal, and the terminal needs to perform processes such as coding, modulation and channelization on the loaded data. Moreover, on a designated bandwidth, data services of only one terminal can be loaded and transmitted at one time, and the data services of multiple terminals can not be loaded and transmitted at the same time. However, in this embodiment, the simulation data are imported to the memory of the uplink master-control DSP of the terminal after the terminal is powered on, and the simulation data are transmitted after the terminal successfully accesses the base station.

In accordance with the embodiment, the terminal imports the simulation data to the memory of the uplink master-control DSP of the terminal at a designated moment (for example, after the terminal is powered on) and transmits the simulation data after the terminal successfully accesses the base station, thus the problem that a single terminal can not load data services of multiple terminals at the same time is solved. Therefore, the effect of simulating to load noise transmission, load multi-terminal transmission, and load noise and terminal service transmission is achieved. This embodiment makes full use of current hardware and software resources of the terminal without increasing the development investment of the hardware and software of the terminal, thereby realizing the effect of simulating to load noise transmission and load multi-terminal transmission.

Embodiment 2

Figure 2:
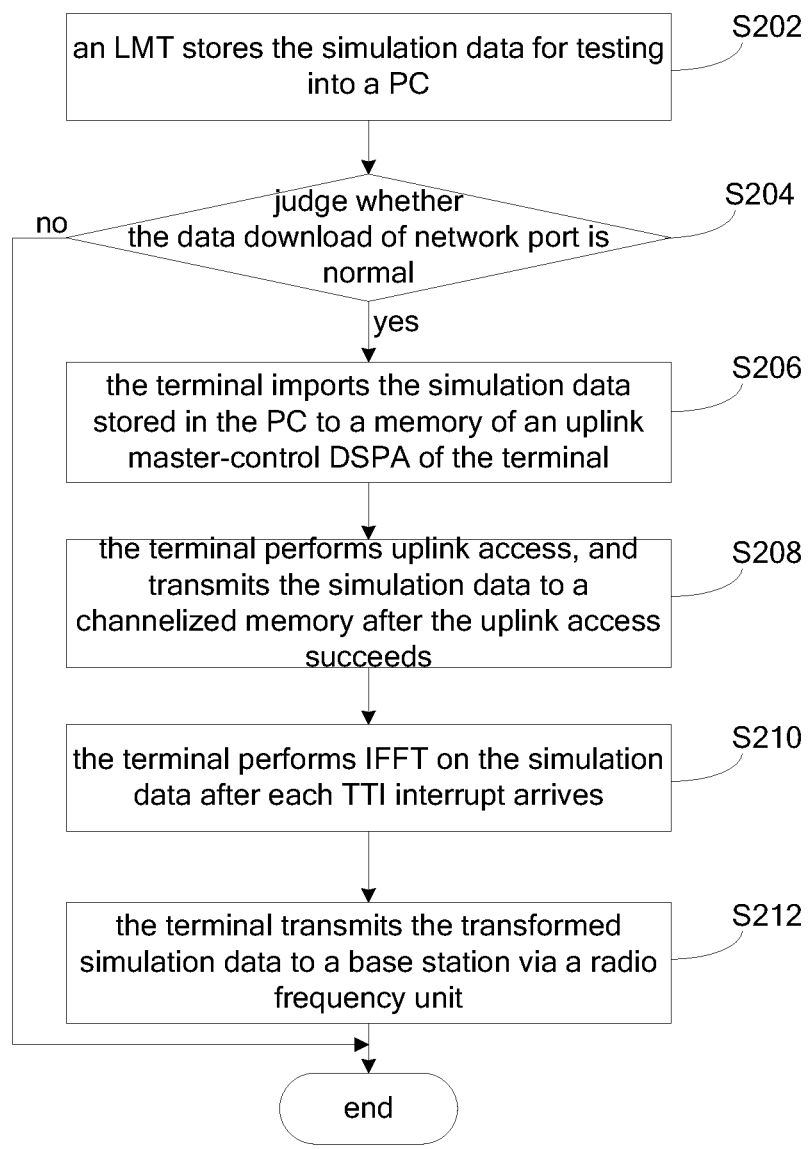
FIG. 2 shows a flowchart of a method for loading uplink simulation data of a terminal according to the Embodiment 2 of the disclosure.

This embodiment is described by taking the terminal adopting an FDD transmission mode for example. FIG. 2 shows a flowchart of a method for loading uplink simulation data of a terminal according to the Embodiment 2 of the disclosure; as shown in FIG. 2, the method comprises the following steps.

Step S202: a Local Maintenance Terminal (LMT) stores simulation data for testing into a Personal Computer (PC), wherein the PC is connected with the terminal through a network port.

The simulation data can be generated according to test requirements, for example, the simulation data are simulated service data of multiple terminals. In order to achieve a testing purpose, the simulation data can be coded, modulated and channelized in advance, for example, the simulation data are processed by an algorithm simulation platform in advance, wherein the algorithm simulation platform can be implemented by adopting MATLAB software.

Step S204: after being powered on, the terminal judges whether a data download of the network port is normal; if so, execute Step S206; otherwise, end the current process.

Step S206: the terminal imports the simulation data stored in the PC to a memory of an uplink master-control DSPA of the terminal.

Step S208: the terminal performs uplink access, and transmits the simulation data to a channelized memory through a DSP for processing channelization after the uplink access succeeds.

Step S210: the terminal performs an IFFT on the simulation data after each TTI interrupt arrives.

When the terminal adopts the FDD mode, uplink subframe scheduling exists in each TTI; therefore, the terminal performs the IFFT on the simulation data after each TTI interrupt arrives and transmits the transformed simulation data.

Before Step S210, the method further comprises: the terminal performs a CRC on the simulation data; if the CRC succeeds, Step S210 is executed; if the CRC fails, the current process is ended.

Step S212: the terminal transmits the transformed simulation data to a base station via a radio frequency unit.

In this embodiment, the terminal transmits the transformed simulation data to the radio frequency unit through a Field Programmable Gate Array (FPGA).

In accordance with the embodiment, the terminal imports the simulation data to the memory of the uplink master-control DSP of the terminal after the terminal is powered on and transmits the simulation data in the FDD mode after the terminal successfully accesses the base station, enabling a high transmission frequency; thus the problem that a single terminal can not load data services of multiple terminals at the same time is solved. Therefore, the effect of simulating to load noise transmission, load multi-terminal transmission, and load noise and terminal service transmission is achieved. This embodiment makes full use of current hardware and software resources of the terminal without increasing the development investment of the hardware and software of the terminal, thereby realizing the effect of simulating to load noise transmission and load multi-terminal transmission.

Embodiment 3

Figure 3:
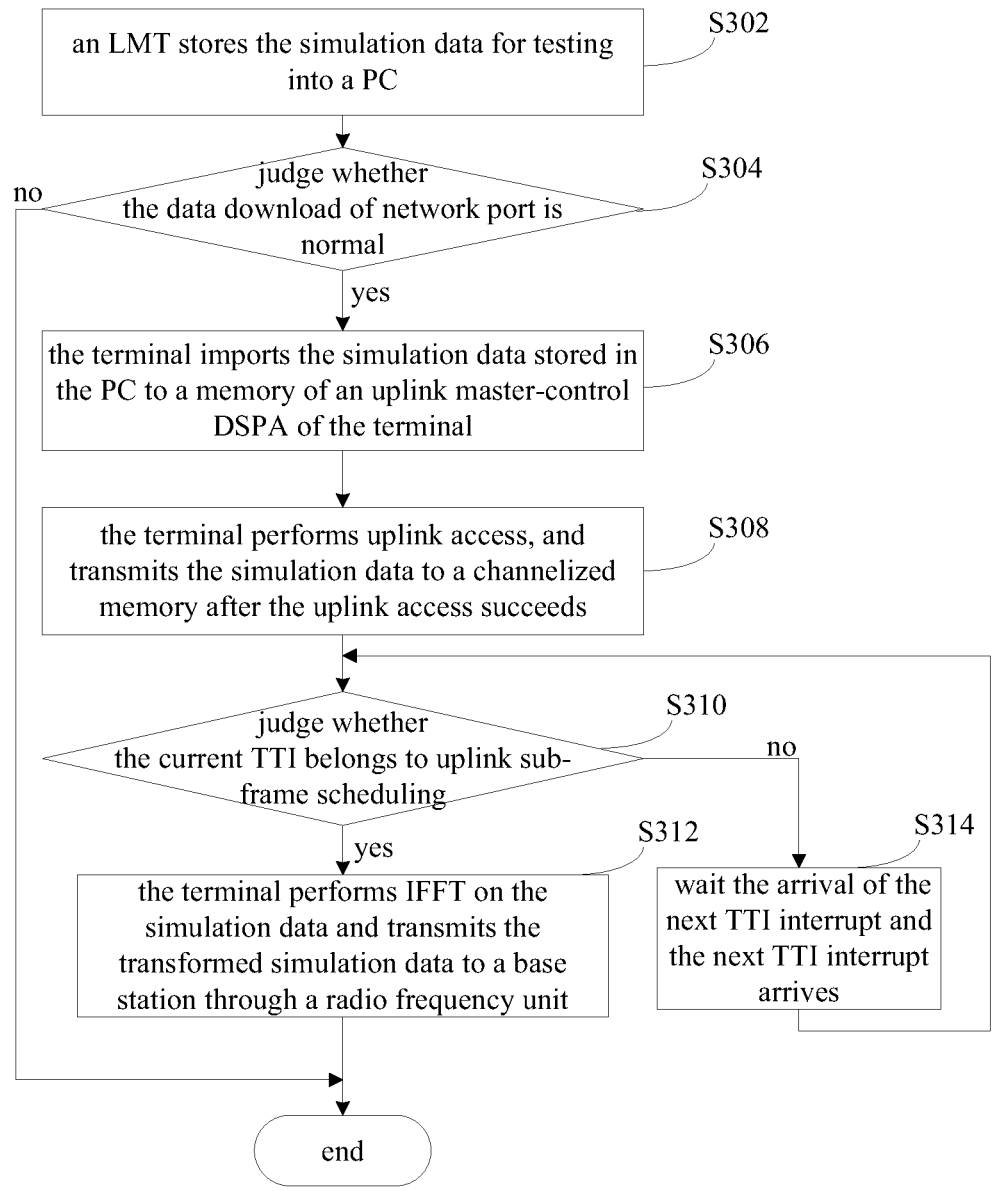
FIG. 3 shows a flowchart of a method for loading uplink simulation data of a terminal according to the Embodiment 3 of the disclosure.

This embodiment is described by taking the terminal adopting a TDD transmission mode for example. FIG. 3 shows a flowchart of a method for loading uplink simulation data of a terminal according to the Embodiment 3 of the disclosure; as shown in FIG. 3, the method comprises the following steps.

Step S302 to Step S308 are the same as Step S202 to Step S208, thus no further description is needed here.

Step S310: after each TTI interrupt arrives, the terminal judges whether the current TTI belongs to uplink sub-frame scheduling; if so, execute Step S312; otherwise, execute Step S314.

Step S312: the terminal performs the IFFT on the simulation data and transmits the transformed simulation data to a base station through a radio frequency unit.

Before Step S312, the method can further comprise: the terminal performs a CRC on the simulation data; if the CRC succeeds, Step S312 is executed; if the CRC fails, the current process is ended.

Step S314: wait a next TTI interrupt; after the next TTI interrupt arrives, return to Step S310.

If the terminal adopts the TDD transmission mode, since in the TDD transmission mode the terminal needs to transmit the loaded simulation data at uplink and downlink alternately according to a current sub-frame matching mode; if the current TTI is not the uplink sub-frame scheduling, the terminal does not perform the IFFT on the simulation data and does not transmit the simulation data in the current TTI.

In accordance with the embodiment, the terminal imports the simulation data to the memory of the uplink master-control DSP of the terminal after the terminal is powered on and transmits the simulation data in the TDD mode after the terminal successfully accesses the base station, enabling a small interference between data; thus the problem that a single terminal can not load data services of multiple terminals at the same time is solved. Therefore, the effect of simulating to load noise transmission, load multi-terminal transmission, and load noise and terminal service transmission is achieved. This embodiment makes full use of current hardware and software resources of the terminal without increasing the development investment of the hardware and software of the terminal, thereby realizing the effect of simulating to load noise transmission and load multi-terminal transmission.

Embodiment 4

Figure 4:
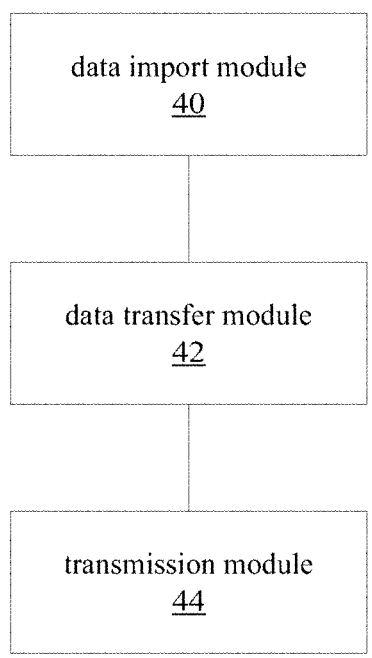
FIG. 4 shows a structure diagram of a terminal according to the Embodiment 4 of the disclosure.

FIG. 4 shows a structure diagram of a terminal according to the Embodiment 4 of the disclosure; as shown in FIG. 4, the terminal comprises a data import module 40, a data transfer module 42 and a transmission module 44. Each module of the terminal is described below.

The data import module 40 is configured to import simulation data to a memory of an uplink master-control DSP of the terminal after the terminal is powered on;

the data transfer module 42 is coupled with the data import module 40 and is configured to transmit the simulation data to a channelized memory after an uplink access of the terminal succeeds; and the transmission module 44 is coupled with the data transfer module 42 and is configured to perform an IFFT on the simulation data in each uplink sub-frame and transmit the transformed simulation data to a base station via a radio frequency unit.

The terminal adopts an FDD transmission mode; the transmission module 44 comprises: a first data transformation unit, which is configured to perform the IFFT on the simulation data after each TTI interrupt arrives; and a first transmission unit, which is configured to transmit the transformed simulation data to the base station via the radio frequency unit.

The terminal adopts a TDD transmission mode; the transmission module 44 comprises: a second data transformation unit, which is configured to determine whether a current TTI belongs to uplink sub-frame scheduling after each TTI interrupt arrives, if so, perform the IFFT on the simulation data; and a second transmission unit, which is configured to transmit the transformed simulation data to the base station via the radio frequency unit.

The simulation data imported by the data import module 40 are data processed by an algorithm simulation platform in advance, and at least comprise one of the following: simulated service data of multiple terminals, noises or data consisting of noises and service data.

Preferably, the terminal further comprises: a check module, which is configured to perform a CRC on the simulation data in the channelized memory and trigger the transmission module 44 to perform the IFFT on the simulation data after the CRC succeeds.

The terminal of this embodiment imports the simulation data to the memory of the uplink master-control DSP of the terminal after the terminal is powered on through the data import module 40, performs the IFFT on the simulation data and transmits the transformed simulation data after the terminal successfully accesses the base station through the transmission module 44, thus the problem that a single terminal can not load data services of multiple terminals at the same time is solved. Therefore, the effect of simulating to load noise transmission, load multi-terminal transmission, and load noise and terminal service transmission is achieved. This embodiment makes full use of current hardware and software resources of the terminal without increasing the development investment of the hardware and software of the terminal, thereby realizing the effect of simulating to load noise transmission and load multi-terminal transmission.

The method for loading uplink simulation data of a terminal or the terminal provided by the above embodiments can be used for noise simulation tests and multi-UE simulation tests.

From the description above, it can be seen that the disclosure achieves the following technique effects: the terminal imports the simulation data to the memory of the uplink master-control DSP of the terminal after being powered on, and the terminal performs the IFFT on the simulation data and transmits the transformed simulation data after successfully accessing the base station, thus the problem that a single terminal can not load data services of multiple terminals at the same time is solved. Therefore, the effect of simulating to load noise transmission, load multi-terminal transmission, and load noise and terminal service transmission is achieved. This disclosure makes full use of current hardware and software resources of the terminal without increasing the development investment of the hardware and software of the terminal, thereby realizing the effect of simulating to load noise transmission and load multi-terminal transmission.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for loading uplink simulation data of a terminal, comprising:
   the terminal importing simulation data to a memory of an uplink master-control Digital Signal Processor (DSP) of the terminal, after the terminal is powered on;
   the terminal performing uplink access and transmitting the simulation data to a channelized memory after the uplink access succeeds; and
   the terminal performing an Inverse Fast Fourier Transform (IFFT) on the simulation data in each uplink sub-frame and transmitting the transformed simulation data to a base station via a radio frequency unit;
   wherein before performing the IFFT on the simulation data, the method further comprises: performing a Cyclic Redundancy Check (CRC) on the simulation data; after the CRC succeeds, executing the step of performing the IFFT on the simulation data.

2. The method according to claim 1, wherein the terminal adopts a Frequency Division Duplex (FDD) transmission mode; the step of the terminal performing the IFFT on the simulation data in each uplink sub-frame comprises: the terminal performing the IFFT on the simulation data after each Transmit Time Interval (TTI) interrupt arrives.

3. The method according to claim 2, wherein the simulation data are data processed by an algorithm simulation platform in advance, and the simulation data at least comprise one of the following: simulated service data of multiple terminals, noises or data consisting of noises and service data.

4. The method according to claim 2, wherein before performing the IFFT on the simulation data, the method further comprises: performing a Cyclic Redundancy Check (CRC) on the simulation data; after the CRC succeeds, executing the step of performing the IFFT on the simulation data.

5. The method according to claim 1, wherein the terminal adopts a Time Division Duplex (TDD) transmission mode; the step of the terminal performing the IFFT on the simulation data in each uplink sub-frame comprises: after each TTI interrupt arrives, the terminal determining whether a current TTI belongs to uplink sub-frame scheduling, if so, the terminal performing the IFFT on the simulation data.

6. The method according to claim 5, wherein the simulation data are data processed by an algorithm simulation platform in advance, and the simulation data at least comprise one of the following: simulated service data of multiple terminals, noises or data consisting of noises and service data.

7. The method according to claim 1, wherein the simulation data are data processed by an algorithm simulation platform in advance, and the simulation data at least comprise one of the following: simulated service data of multiple terminals, noises or data consisting of noises and service data.

8. A terminal, comprising:
   a data import module, which is configured to import simulation data to a memory of an uplink master-control DSP of the terminal after the terminal is powered on;
   a data transfer module, which is configured to transmit the simulation data to a channelized memory after an uplink access of the terminal succeeds; and
   a transmission module, which is configured to perform an IFFT on the simulation data in each uplink sub-frame and transmit the transformed simulation data to a base station via a radio frequency unit;
   a check module, which is configured to perform a CRC on the simulation data in the channelized memory and trigger the transmission module to perform the IFFT on the simulation data after the CRC succeeds.

9. The terminal according to claim 8, wherein the terminal adopts an FDD transmission mode; the transmission module comprises: a first data transformation unit, which is configured to perform the IFFT on the simulation data after each TTI interrupt arrives; and a first transmission unit, which is configured to transmit the transformed simulation data to the base station via the radio frequency unit.

10. The terminal according to claim 9, wherein the simulation data imported by the data import module is data processed by an algorithm simulation platform in advance, and the simulation data imported by the data import module at least comprise one of the following: simulated service data of multiple terminals, noises or data consisting of noises and service data.

11. The terminal according to claim 8, wherein the terminal adopts a TDD transmission mode; the transmission module comprises: a second data transformation unit, which is configured to determine whether a current TTI belongs to uplink sub-frame scheduling after each TTI interrupt arrives, if so, perform the IFFT on the simulation data; and a second transmission unit, which is configured to transmit the transformed simulation data to the base station via the radio frequency unit.

12. The terminal according to claim 11, wherein the simulation data imported by the data import module is data processed by an algorithm simulation platform in advance, and the simulation data imported by the data import module at least comprise one of the following: simulated service data of multiple terminals, noises or data consisting of noises and service data.

13. The terminal according to claim 8, wherein the simulation data imported by the data import module is data processed by an algorithm simulation platform in advance, and the simulation data imported by the data import module at least comprise one of the following: simulated service data of multiple terminals, noises or data consisting of noises and service data.

* * * * *